US009601733B2

(12) United States Patent
Sham (10) Patent No.: US 9,601,733 B2
(45) Date of Patent: Mar. 21, 2017

(54) BATTERY PACK OF ELECTRIC VEHICLE, ELECTRIC VEHICLE CHASSIS AND METHOD FOR REPLACING BATTERY MODULES

(71) Applicant: Thunder Power Hong Kong Ltd., Central (HK)

(72) Inventor: Wellen Sham, Taipei (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 15/006,126

(22) Filed: Jan. 26, 2016

(65) Prior Publication Data

US 2016/0276638 A1 Sep. 22, 2016

Related U.S. Application Data

(60) Provisional application No. 62/273,995, filed on Dec. 31, 2015, provisional application No. 62/133,991, (Continued)

(51) Int. Cl.
*H01M 2/10* (2006.01)
*B60K 1/04* (2006.01)
(Continued)

(52) U.S. Cl.
CPC ............ *H01M 2/1077* (2013.01); *B60K 1/04* (2013.01); *B60L 11/1877* (2013.01); (Continued)

(58) Field of Classification Search
CPC ...... B60K 1/10; H01M 2/1077; H01M 2/1083
See application file for complete search history.

(56) References Cited

U.S. PATENT DOCUMENTS 7,332,242 B2 * 2/2008 Sato ..................... H01M 2/0267
429/153
2012/0303397 A1 * 11/2012 Prosser ................. H02J 7/0054
705/7.12

(Continued)

FOREIGN PATENT DOCUMENTS

AU 2008200543 A1 8/2009

OTHER PUBLICATIONS

European Search Report for EP 16 16 0486 dated Jul. 6, 2016, 12 pages.

*Primary Examiner* — John Walters
*Assistant Examiner* — James Triggs
(74) *Attorney, Agent, or Firm* — Kilpatrick Townsend & Stockton LLP (57) ABSTRACT

Provided are systems and methods for configuring battery packs in electric vehicles. A battery pack may include a plurality of battery modules, a support part, and at least one opening provided on the support part. The support part may be provided with a bottom for supporting the plurality of battery modules, sides, a top, and an accommodation space formed by the bottom, the sides, and the top for accommodating the plurality of battery modules. The opening provided on the bottom of the support part may enable the plurality of battery modules to be passed through the at least one opening and be detachably mounted to the bottom of the support part so as to be supported by the bottom.

17 Claims, 9 Drawing Sheets

Related U.S. Application Data filed on Mar. 16, 2015, provisional application No. 62/150,848, filed on Apr. 22, 2015.

(51) Int. Cl.
  *B60L 11/18* (2006.01)
  *B60S 5/06* (2006.01)
  *H01M 2/02* (2006.01)

(52) U.S. Cl.
  CPC ....... *B60L 11/1879* (2013.01); *H01M 2/1083* (2013.01); *H01M 2/1094* (2013.01); *B60K 2001/0438* (2013.01); *B60K 2001/0472* (2013.01); *B60S 5/06* (2013.01); *H01M 2/024* (2013.01); *H01M 2220/20* (2013.01)

(56) References Cited

U.S. PATENT DOCUMENTS

2013/0136975 A1  5/2013  Uchida
2014/0017528 A1  1/2014  Uehara et al.

\* cited by examiner

BATTERY PACK OF ELECTRIC VEHICLE, ELECTRIC VEHICLE CHASSIS AND METHOD FOR REPLACING BATTERY MODULES

CROSS-REFERENCES TO RELATED APPLICATIONS

This application claims the benefit and priority of U.S. Provisional Patent Application No. 62/273,995, filed on Dec. 31, 2015, which claims the benefit and priority of U.S. Provisional Application No. 62/133,991, filed on Mar. 16, 2015 titled "IMPROVEMENTS TO ELECTRIC VEHICLES", and the benefit and priority of U.S. Provisional Patent Application No. 62/150,848, filed on Apr. 22, 2015 titled "IMPROVEMENTS TO ELECTRIC VEHICLES", both of which are herein incorporated by reference in its entirety for all purposes.

BACKGROUND OF THE INVENTION

The present disclosure relates to the field of electric vehicles, and particularly relates to battery pack structures of electric vehicles, electric vehicle chassis with battery packs and methods for removing and replacing battery modules from electric vehicle chassis.

Serving as a primary energy source, a battery pack is one of the most important components of the electric vehicle. The battery pack is usually formed by combination of a plurality of battery modules. During operation of an electric vehicle, some of the plurality of battery modules may malfunction. However, because battery modules in battery packs are usually mounted as an integral structure, in the case of malfunction of a single battery module, the malfunctioned battery module cannot be separately removed and replaced.

BRIEF SUMMARY OF THE INVENTION

Provided are systems and methods for configuring battery packs in electric vehicles. In one aspect of the present disclosure, a battery pack for an electric vehicle is provided. The battery pack may include a plurality of battery modules. The battery pack may also include a support part provided with a bottom for supporting the plurality of battery modules, sides, a top, and an accommodation space formed by the bottom, the sides, and the top for accommodating the plurality of battery modules. The battery pack may further include at least one opening provided on either the bottom or sides of the support part to enable the plurality of battery modules to be passed through the at least one opening and be detachably mounted to either the bottom or sides of the support part so as to be supported by either the bottom or sides.

In some embodiments, the battery pack may further include a layer mounted above the top of the support part to cover the plurality of battery modules accommodated in the support part. In some embodiments, the at least one opening is provided on the bottom of the support part. In some embodiments, the battery pack may further comprise first and second mounting flanges provided on each of the plurality of battery modules. The first and second mounting flanges may be respectively arranged on two opposite sides of a bottom of each of the plurality of battery modules so that the plurality of battery modules can be mounted to the bottom of the support part using the first and second mounting flanges. The first and second mounting flanges may be mounted below the bottom of the support part.

In some embodiments, the plurality of battery modules may be mounted to the bottom of the support part through fasteners. In some embodiments, the battery pack may further comprise a protector sheet mounted below the bottom of the support part to cover the plurality of battery modules accommodated in the support part. In some embodiments, the layer mounted above the top of the support part is a carbon fiber composite layer.

In another aspect of the present disclosure, an electric vehicle chassis is provided. The electric vehicle chassis may include an underbody panel located below a cabin of an electric vehicle. The electric vehicle chassis may also include two side sills extending along the longitudinal direction of the underbody panel. Each of the two side sills may include an upper part and a lower part and may be connected to one of the two opposite sides of the underbody panel through the upper part thereof. The electric vehicle chassis may further include a battery pack located below the underbody panel and between the two side sills. The battery pack may be configured to be mounted to the lower parts of the two side sills through the bottom of the support part.

In some embodiments, the electric vehicle chassis may further include a layer mounted above the top of the support part to cover the plurality of battery modules accommodated in the support part. In some embodiments, the at least one opening provided on the support part is provided on the bottom of the support part. In some embodiments, the bottom of the support part is provided with mounting flanges extending along the longitudinal direction of the underbody panel, and the battery pack may be mounted to the lower parts of the two side sills using the mounting flanges. In some embodiments, the mounting flanges of the support part are mounted to the lower parts of the two side sills through fasteners.

In some embodiments, the electric vehicle chassis may further include first and second mounting flanges provided on each of the plurality of battery modules. The first and second mounting flanges may be respectively arranged on two opposite sides of a bottom of each of the plurality of battery modules so that the plurality of battery modules can be mounted to the bottom of the support part using the first and second mounting flanges. The first and second mounting flanges may be mounted below the bottom of the support part.

In some embodiments, the plurality of battery modules are mounted to the bottom of the support part through fasteners. In some embodiments, the electric vehicle chassis may further include a protector sheet mounted below the bottom of the support part to cover the plurality of battery modules accommodated in the support part. In some embodiments, the layer mounted above the top of the support part is a carbon fiber composite layer.

In another aspect of the present disclosure, a method for replacing a battery module in an electric vehicle is provided. The method may include identifying a first battery module from among a plurality of battery modules in a battery pack. The method may also include detaching the first battery module from the bottom of the support part. The method may further include removing the first battery module from the support part by passing the first battery module through the at least one opening. In addition, the method may include inserting a second battery module into the support part by passing the second battery module through the at least one opening and mounting the second battery module to the bottom of the support part.

In some embodiments, the second battery module may have a higher electrical potential energy than the first battery module. In some embodiments, the method may further include removing a protector sheet from below the bottom of the support part. In some embodiments, the method may also include removing fasteners that are configured to mount the first battery module to the bottom of the support part.

DETAILED DESCRIPTION OF THE INVENTION

The present disclosure provides systems and methods that overcome the limitations of current battery packs employed in electric vehicles. The present disclosure is intended to provide a battery pack with battery modules convenient to be replaced, and a method for removing and/or replacing the battery modules from an electric vehicle chassis. Compared to currently available battery packs, battery packs provided by the present disclosure have several advantages, which include: battery packs of the present disclosure are provided with a support part, each battery module can be separately mounted in the support part through an opening provided in the bottom or side of the support part, and due to this modular installation manner, the battery modules can be separately disassembled and replaced from the battery pack, so that the replacement is convenient, a large amount of tedious and complex disassembly work is avoided, and the cost is reduced.

Figure 1:
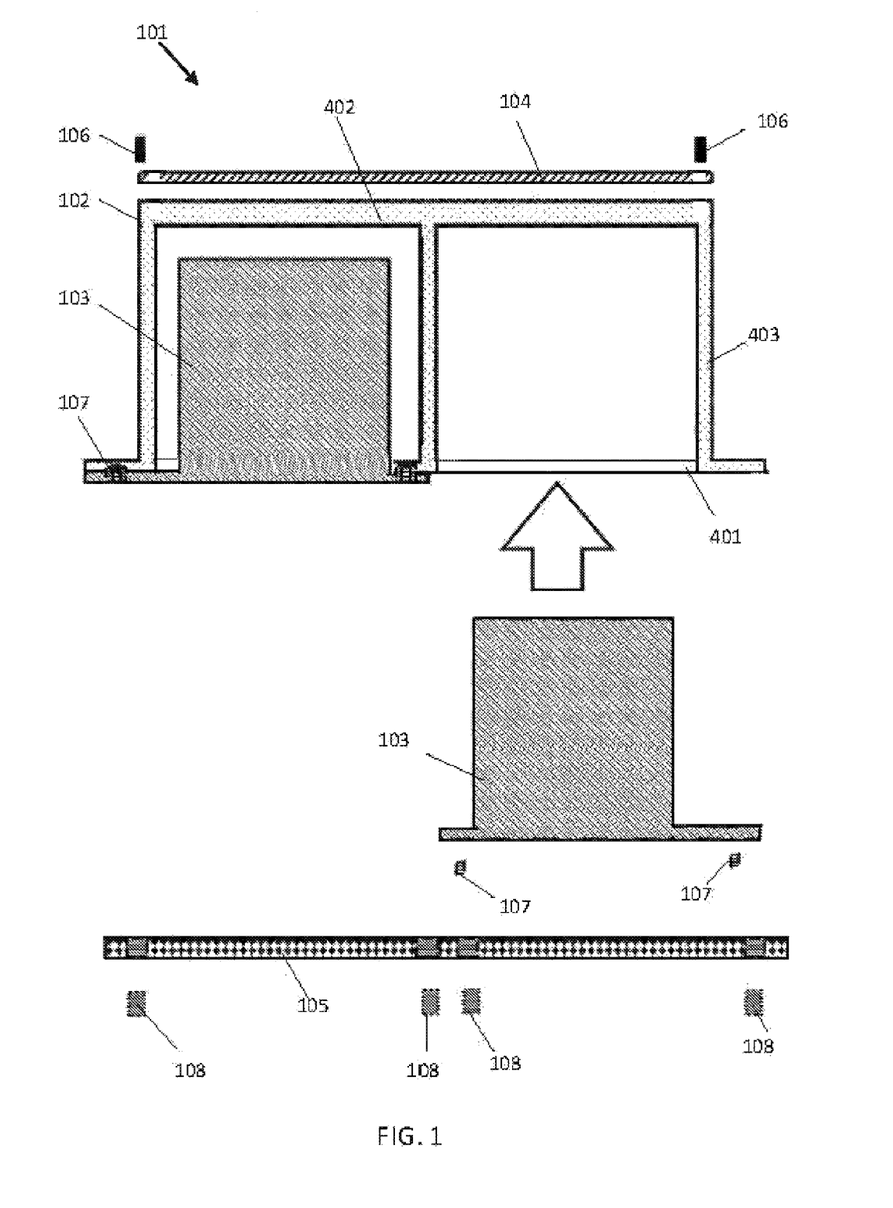
FIG. 1 illustrates a schematic sectional view showing the mounting of a battery module to a battery pack according to a first example of the present disclosure.

FIG. 1 illustrates a schematic sectional view showing the mounting of a battery module 103 to a battery pack 101 according to a first example of the present disclosure, which is cut perpendicular to the longitudinal direction of the battery pack. As shown in FIG. 1, the battery pack 101 of an electric vehicle may include a plurality of battery modules 103 and a support part 102, and the plurality of battery modules 103 may be mounted in the support part 102.

Figure 2:
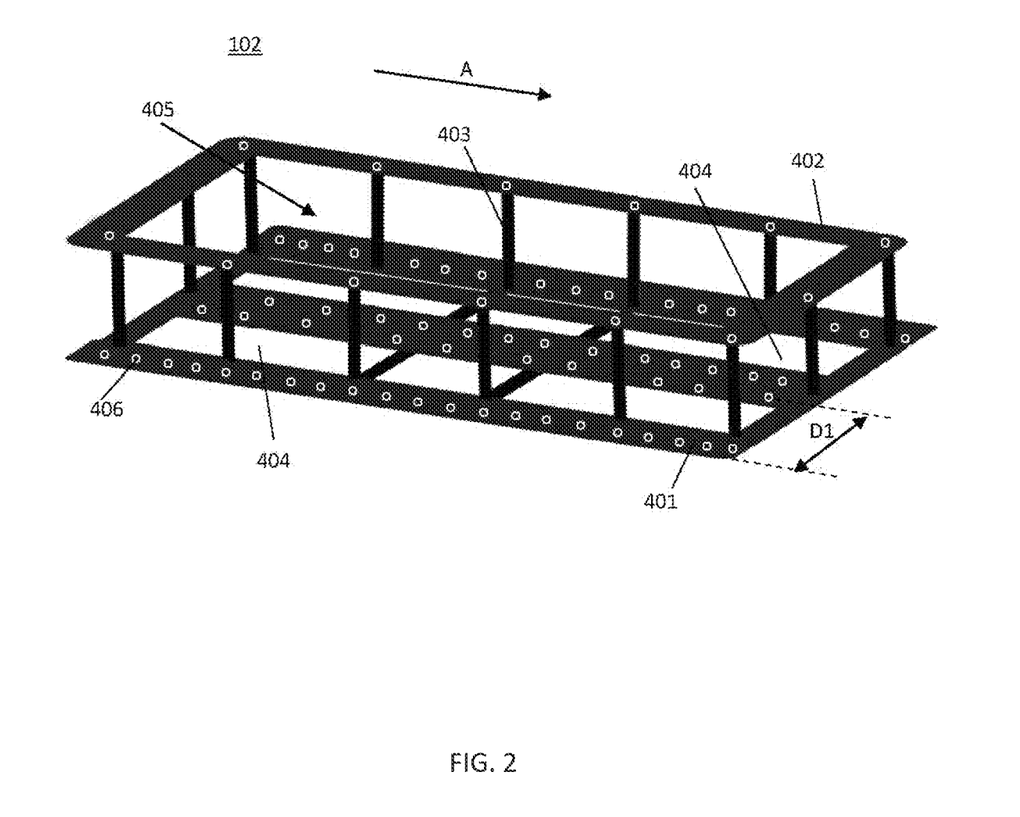
FIG. 2 illustrates a perspective schematic view showing a support part of the battery pack according to a first example of the present disclosure.

FIG. 2 illustrates a perspective schematic view showing the support part 102 of the battery pack 101 according to the first example of the present disclosure. The longitudinal direction (as shown by the arrow A in FIG. 2) of the support part 102 is parallel with the longitudinal direction of the battery pack 101. As shown in FIG. 2, in some embodiments the support part 102 is provided with a bottom 401, a top 402 and four sides 403. The bottom 401, the top 402 and the sides 403 together form an accommodation space 405. The bottom 401 may include a plurality of openings 404, each of which may have a width D1 in the direction perpendicular to the longitudinal direction of the support part 102. The sides 403 can be formed by a plurality of columns extending upwards from the bottom 401. The top 402 may be located above the sides 403 and may be formed with a frame structure, such as with four edges connected together.

In some embodiments, the battery modules 103 may be passed through the openings 404 from the underside of the bottom 401 into the accommodation space 405. The support part 102 shown in FIG. 2 includes two openings along the width direction of the support part 102 (perpendicular to the longitudinal direction of the support part 102), and as such, the support part 102 may accommodate two rows of battery modules 103 as seen along the longitudinal direction of the support part 102. In some embodiments, the support part 102 may accommodate more than two rows of battery modules 103. The support part 102 is usually made from a lightweight high-strength material, such as aluminum alloy, magnesium alloy and any other lightweight high-strength material.

In some embodiments, the support part 102 may only be provided with the bottom 401, but may lack the top 402 and the sides 403. However, the top 402 and the sides 403 may make the support part 102 more stable. In some embodiments, the bottom 401, the top 402 and the sides 403 may also be made from plate like materials. However, the frame structures as shown in FIG. 2 may reduce the weight of the support part.

Figure 3:
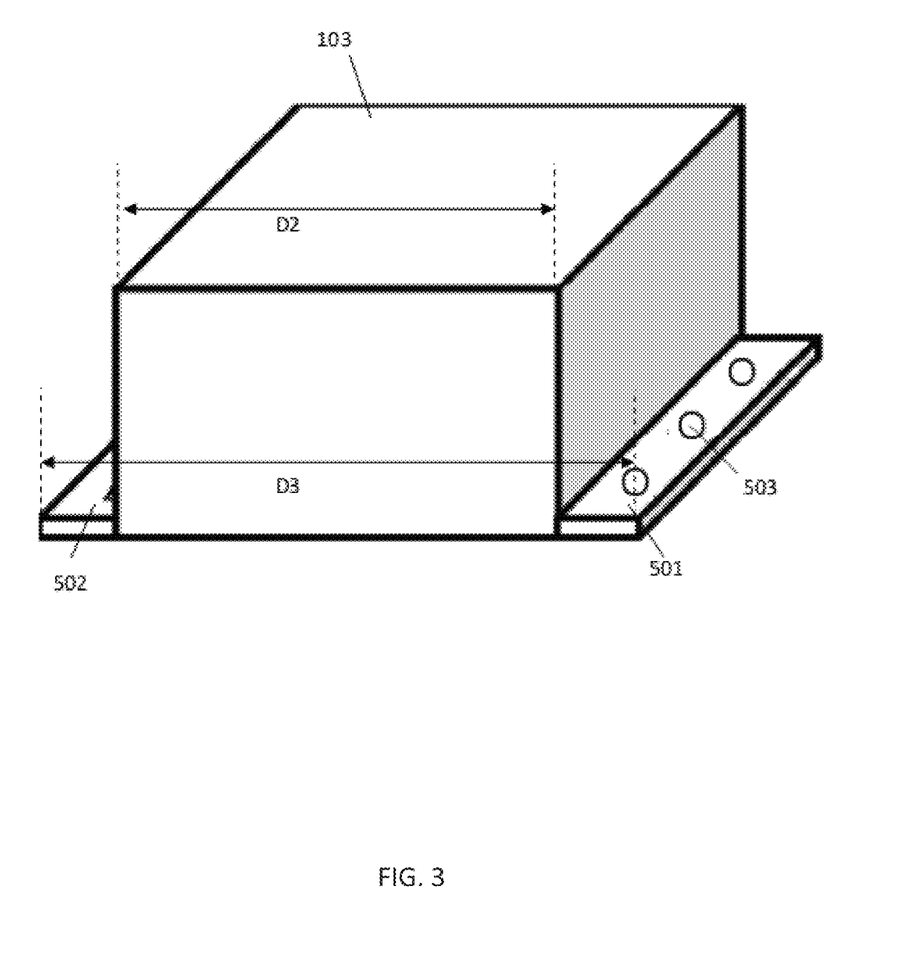
FIG. 3 illustrates a perspective schematic view showing a battery module according to an exemplary embodiment of the present disclosure.

FIG. 3 illustrates a perspective schematic view showing a battery module 103 according to an exemplary embodiment of the present disclosure. A battery module may provide electrical energy to power an electric motor located within an electric vehicle. During vehicle operation, a given battery module may lose electrical potential energy, or voltage, and may need to be replaced. The manner in which one battery module loses electrical potential energy during vehicle operation may differ and be independent from how another battery module loses electrical potential energy.

As shown in FIG. 3, each battery module 103 may be provided with a first mounting flange 501 and a second mounting flange 502 on opposite sides of a bottom of the body thereof. In some embodiments, the body of each battery module 103 is a width D2, and the distance between the outer edges of the first mounting flange 501 and the second mounting flange 502 along the longitudinal direction thereof is D3. In some embodiments, the width D1 of each opening 404 in the bottom 401 of the support part 102 is greater than the width D2 of the body of each battery module 103, and is smaller than the distance D3 between the outer edges of the first mounting flange 501 and the second mounting flange 502 along the longitudinal direction thereof. In mounting a battery module 103 to the support part 102, the battery module 103 is arranged such that the longitudinal direction of the first mounting flange 501 and the second mounting flange 502 thereof is parallel with the longitudinal direction of the support part 102, and as such, the body of the battery module 103 is able to pass through the opening 404 from the underside of the opening 404 while the first mounting flange 501 and the second mounting flange 502 of the battery module 103 are unable to pass through the opening 404. Accordingly, the battery module 103 can be mounted to the bottom 401 of the support part 102 through the first mounting flange 501 and the second mounting flange 502. A shown in FIG. 1, after the battery module 103 is mounted to the bottom 401 of the support part 102, the first mounting flange 501 and the second mounting flange 502 are located below the bottom 401 of the support part 102.

As shown in FIG. 1, the battery pack 101 may also comprise a carbon fiber composite layer 104 and a protector sheet 105. The carbon fiber composite layer 104 may be mounted above the top 402 of the support part 102 to cover the plurality of battery modules 103 accommodated in the support part 102. The carbon fiber composite layer 104 is usually made from a refractory material for isolating heat and playing a role of shielding EMI (Electro-Magnetic Interference), however other materials may also be suitable. The protector sheet 105 is mounted below the bottom 401 of the support part 102 to cover the plurality of battery modules 103 accommodated in the support part 102. The protector sheet 105 is usually made from a high-strength material (such as titanium alloy, steel and so on) for protecting the battery modules 103.

As shown in FIG. 3, the first mounting flange 501 and the second mounting flange 502 of the battery module 103 may be provided with mounting holes 503 and as shown in FIG. 2, the bottom 401 of the support part 102 is provided with a plurality of mounting holes 406. Thus, as shown in FIG. 1, the battery modules 103 can be mounted to the bottom 401 of the support part 102 via first fasteners 107 which match the mounting holes. In addition, as shown in FIG. 1, the carbon fiber composite layer 104 and the protector sheet 105 may be mounted to the support part 102 via second fasteners 106 and third fasteners 108, respectively. To this end, as shown in FIG. 2, the top 402 and bottom 401 of the support part 102 are provided with mounting holes for mounting the carbon fiber composite layer 104 and the protector sheet 105. It should be understood that the battery modules 103, the carbon fiber composite layer 104 and the protector sheet 105 can be mounted using other methods other than using fasteners.

An assembly process of the battery pack 101 will now be described below with reference to FIG. 1, FIG. 2 and FIG. 3. In some embodiments, the first step may comprise mounting the battery modules 103 to the support part 102. Specifically, the first step may comprise arranging a battery module 102 such that the longitudinal direction of the first mounting flange 501 and the second mounting flange 502 of the battery module 103 is parallel with the longitudinal direction of the support part 102. The second step may comprise passing the body of the battery module 103 through an opening 404 in the bottom 401 of the support part 102 from the underside of the opening 404 and aligning the mounting holes 503 in the first mounting flange 501 and the second mounting flange 502 of the battery modules 103 with the corresponding mounting holes 406 in the bottom 401 of the support part 102. The third step may comprise inserting the first fasteners 107 through the mounting holes and fastening the first fasteners 107. Thus, following these steps, the battery module 103 may be mounted to the support part 102 and other battery modules may be mounted in the same way as described.

After the plurality battery modules 103 are mounted to the support part 102, the fourth step may comprise mounting the carbon fiber composite layer 104 and the protector sheet 105 to the support part 102. Specifically, the fourth step may comprise mounting the carbon fiber composite layer 104 above the top 402 of the support part 102 through the second fasteners 106 and mounting the protector sheet 105 below the bottom 401 of the support part 102 through the third fasteners 108. It should be understood that the assembly process of the battery pack according to the first example of the present disclosure is not limited to the sequence as described above. For example, the carbon fiber composite layer 104 can be mounted above the top 402 of the support part 102 before the plurality battery modules 103 are mounted to the support part 102.

It can be seen from the above description that the battery modules 103 in the present disclosure may be mounted in the battery pack 101 in a modularized manner. Thus, the plurality of battery modules 103 may be added and/or removed separately from one another. The carbon fiber composite layer 104 and the protector sheet 105 may be mounted independently from each other and from the battery modules and therefore can be removed separately.

Figure 4:
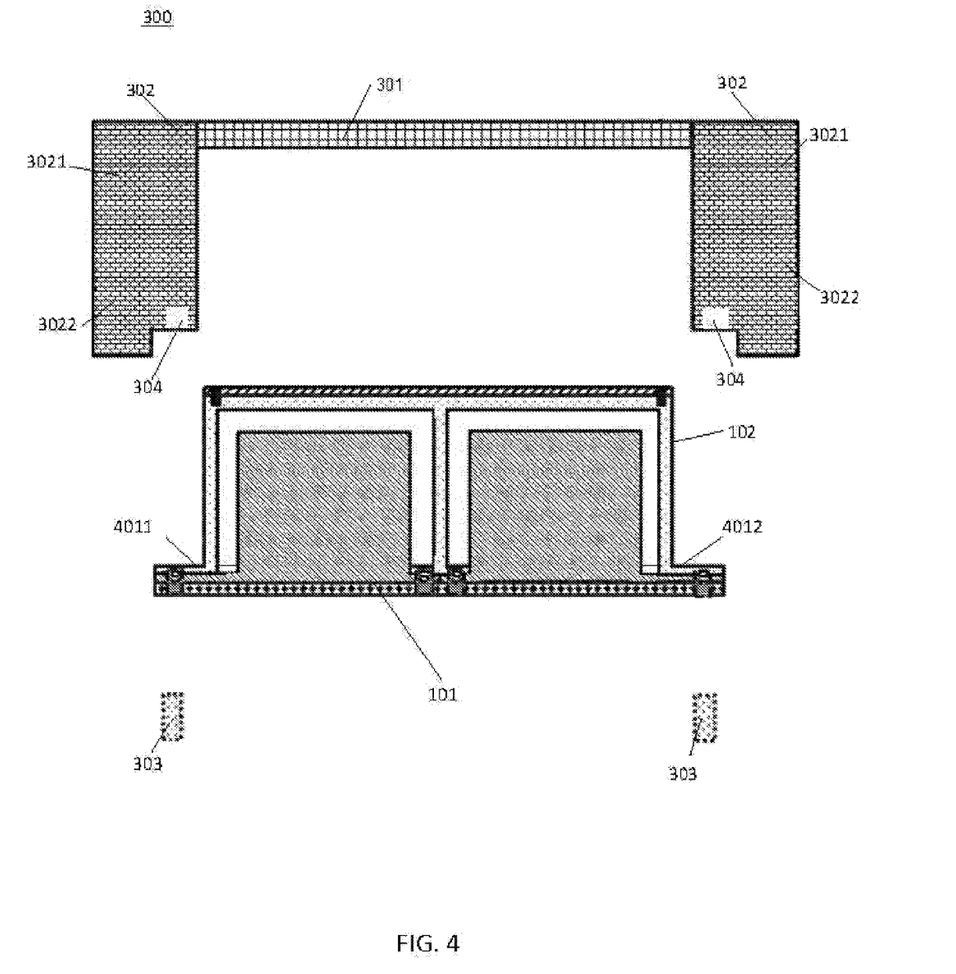
FIG. 4 illustrates an exploded schematic sectional view of an electric vehicle chassis including a battery back according to a first example of the present disclosure.
Figure 5:
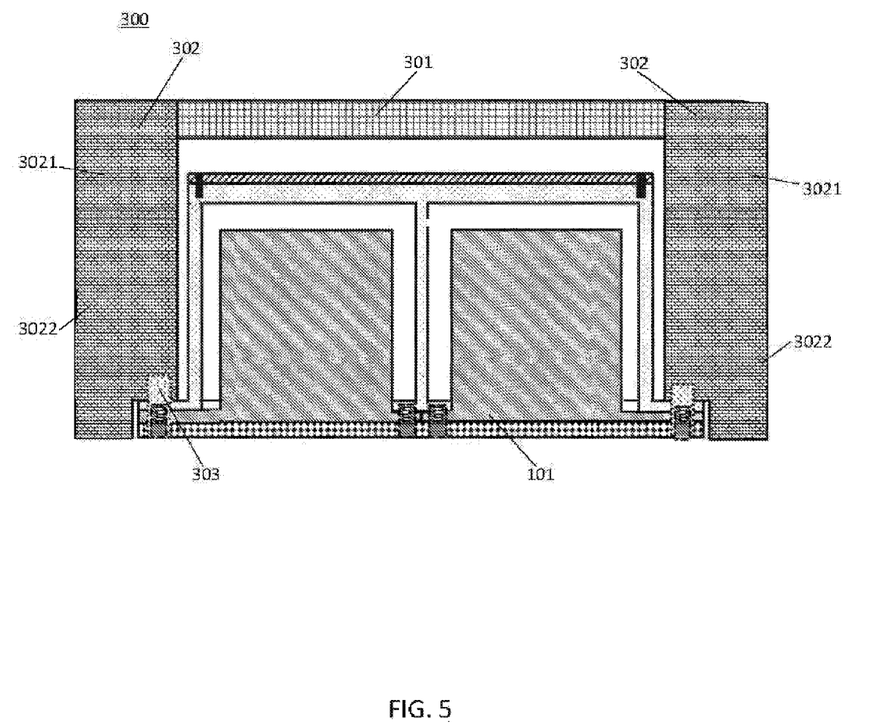
FIG. 5 illustrates a schematic structural sectional view of the electric vehicle chassis including a battery back according to a first example of the present disclosure.

In some embodiments, the battery pack according to the present disclosure constitutes a part of an electric vehicle chassis. FIG. 4 illustrates an exploded schematic sectional view of an electric vehicle chassis including the battery back 101 according to the first example of the present disclosure. FIG. 5 illustrates a schematic structural sectional view of the electric vehicle chassis including a battery back according to the first example of the present disclosure. As shown in FIG. 4 and FIG. 5, in some embodiments, the electric vehicle chassis 300 includes an underbody panel 301, two side sills 302 and a battery pack 101. The underbody panel 301 is located below a cabin (not shown) of an electric vehicle. The two side sills 302 may extend along the longitudinal direction of the underbody panel 301. Each of the two side sills 302 may include an upper part 3021 and a lower part 3022 and may be connected to one of the two opposite sides of the underbody panel 301 through the upper part 3021. The battery pack 101 may be located below the underbody panel 301 and may be located between the two side sills 302, and the battery pack 101 may be mounted to the lower parts 3022 of the side sills 302. In some embodiments, the longitudinal direction of the battery pack 101 is parallel with the longitudinal direction of the underbody panel 301.

To enable the battery pack 101 to be mounted to the lower parts 3022 of the side sills 302, the battery pack 101 according to the first example of the present disclosure may be provided with a first mounting flange 4011 and a second mounting flange 4012 on the opposite sides of the bottom 401 of the support part 102. The longitudinal direction of the first mounting flange 4011 and the second mounting flange 4012 may be parallel with the longitudinal direction of the battery pack 101. Each of the two side sills 302 may be provided with mounting holes 304 at the lower part 3022 thereof, and the first mounting flange 4011 and the second mounting flange 4012 of the support part 102 may also be provided with corresponding mounting holes such that the battery pack 101 can be mounted to the lower parts 3022 of the two side sills 302 via fourth fasteners 303 which match the mounting holes. It should be understood that since the first mounting flange 501 and the second mounting flange 502 of the battery module 103 are located below the bottom 401 of the support part 102, to mount the bottom 401 of the support part 102 to the lower parts 3022 of the two side sills 302, the first mounting flange 501 and the second mounting flange 502 of the battery module 103 can also be provided with mounting holes for the fourth fasteners. However, the first mounting flange 501 and the second mounting flange 502 of the battery module 103 may lack the mounting holes for the fourth fasteners, provided that the width of the first mounting flange 4011 and the second mounting flange 4012 of the support part 102 are set greater than the width of the first mounting flange 501 and the second mounting flange 502 of the battery module 103.

Since the battery pack 101 according to the present embodiment are modularly mounted, in the case of malfunction of a battery module 103, the malfunctioned battery module 103 can be easily removed and replaced. The removal process of the battery modules 103 will be described below.

Figure 6:
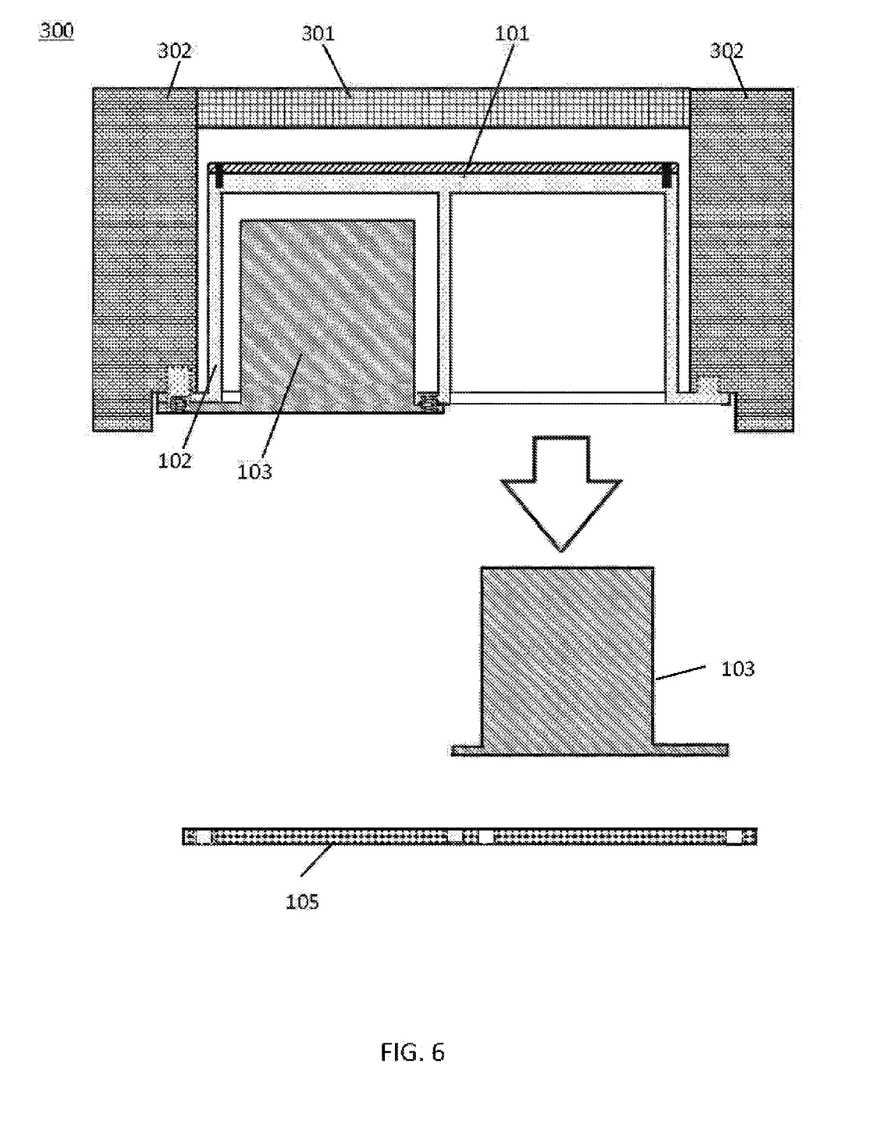
FIG. 6 illustrates a schematic sectional view showing the removal of a battery module from the electric vehicle chassis including the battery back according to a first example of the present disclosure.

FIG. 6 illustrates a schematic sectional view showing the removal of a battery module from the electric vehicle chassis including the battery back according to the first example of the present disclosure. As shown in FIG. 6, when a battery module 103 malfunctions and is to be replaced, the first step may be to identify the malfunctioned battery module that needs to be replaced due to one of several possible reasons, including low electrical potential energy. The next step may be to remove the third fasteners 108 from the underside of the electric vehicle chassis 300 so that the protector sheet 105 can be removed from the support part 102. Next, the first fasteners 107 used by the malfunctioned battery module 103 are removed to allow removal of the malfunctioned battery module 103 from the underside of the support part 102. The process of mounting a replacement battery module 103 in the battery pack 101 is the reverse of the foregoing removal process, and will not be repeated herein.

The first fasteners 107, the second fasteners 106, the third fasteners 108 and the fourth fasteners 303 as mentioned above may be any detachable parts and components used for fastening in the prior art, for example, a bolt. Different fasteners can be used for connecting different components to facilitate removing of the components.

By means of the structures of the battery pack according to the first example of the present disclosure and the electric vehicle chassis including the battery pack, and the method of removing a battery module from an electric vehicle chassis including a battery pack according to the first example of the present disclosure, a malfunctioned battery module 103 can be removed from the electric vehicle chassis from the underside of the chassis separately without influencing other battery modules 103. The battery pack 101 also does not need to be entirely removed, and therefore any malfunctioned battery module 103 can be replaced conveniently through the present disclosure.

Figure 7:
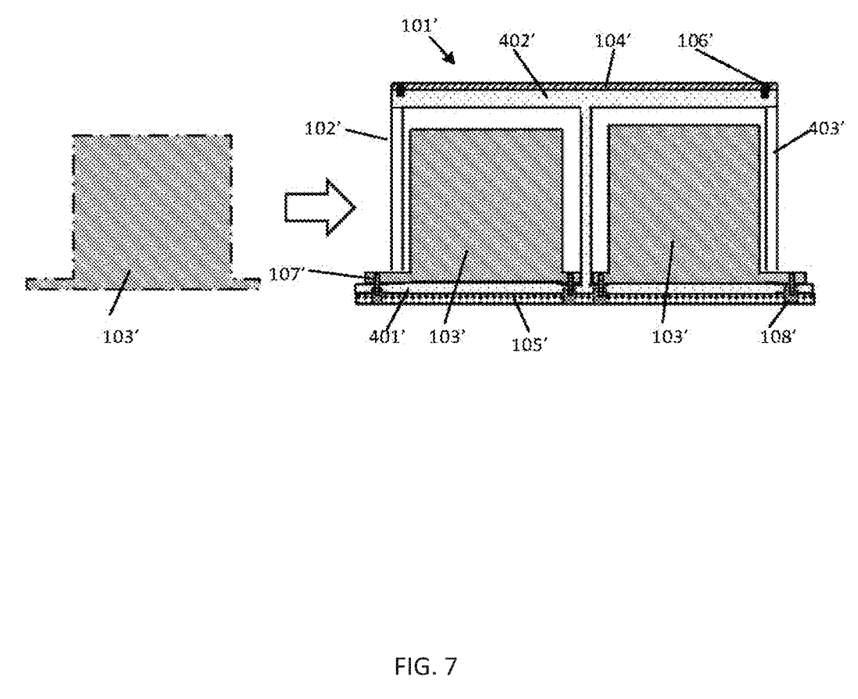
FIG. 7 illustrates a schematic sectional view showing a battery pack according to a second example of the present disclosure.

FIG. 7 illustrates a schematic sectional view showing a battery pack according to a second example of the present disclosure, in which the arrow shows the mounting direction of the battery module. The structure of the battery pack 101' according to the second example is generally similar to that in the first example, with one difference being in that in the first example the battery module 103 is generally detachably mounted in the accommodation space 405 via passing through the bottom 401 of the support part 102 of the battery pack 101. In the second example, a battery module 103' is generally detachably mounted in the accommodation space 405' via passing through the sides 403' of the support part 102' of the battery pack 101'.

Specifically, a plurality of openings are provided in the two sides 403' in the longitudinal direction of the support part 102', so that a plurality of battery modules 103' can pass through the plurality of openings to enter the accommodation space 405' and are detachably mounted at the bottom 401' of the support part 102'. Therefore, when the battery pack 101' is assembled, the battery modules 103' may be passed through the openings from the sides of the openings in the sides 403' of the support part 102' to enter the accommodation space 405', and then the plurality of battery modules 103' may be detachably mounted at the bottom 401' of the support part 102' through the second fasteners 107'. It should be noted that, unlike the first example, according to the second example, the first mounting flange 501' and the second mounting flange 502' of the battery modules 103' may be located above the bottom 401' of the support part 102'.

Since the battery modules 103' enter the accommodation space 405' from the openings in the sides 403', there may be no need to remove the protector sheet 105' when removing a malfunctioned battery module 103' from the battery modules 103'. Therefore, in the second example, the step of mounting the protector sheet 105' below the bottom 401' of the support part 102' through the third fasteners 108' may be prior to or after the step of mounting the battery modules 103' on the support part 102'. The manner of mounting the battery pack 101' according to the second example on the electric vehicle chassis 300' is the same as that according to the first example, and will not be repeated herein.

Figure 8:
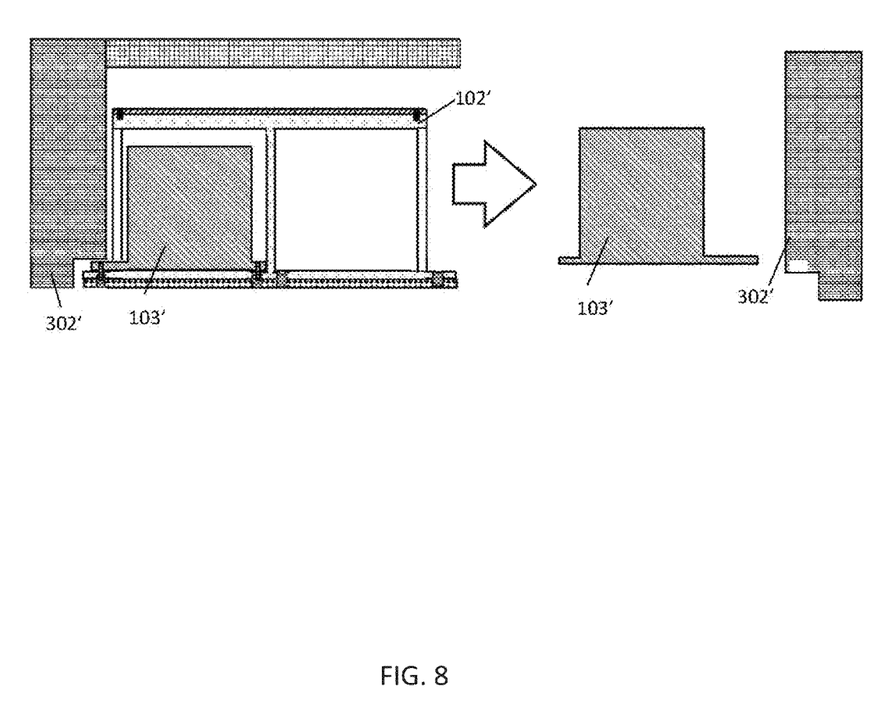
FIG. 8 illustrates a schematic sectional view showing the removal of a battery module from the electric vehicle chassis including the battery back according to a second example of the present disclosure.
Figure 9:
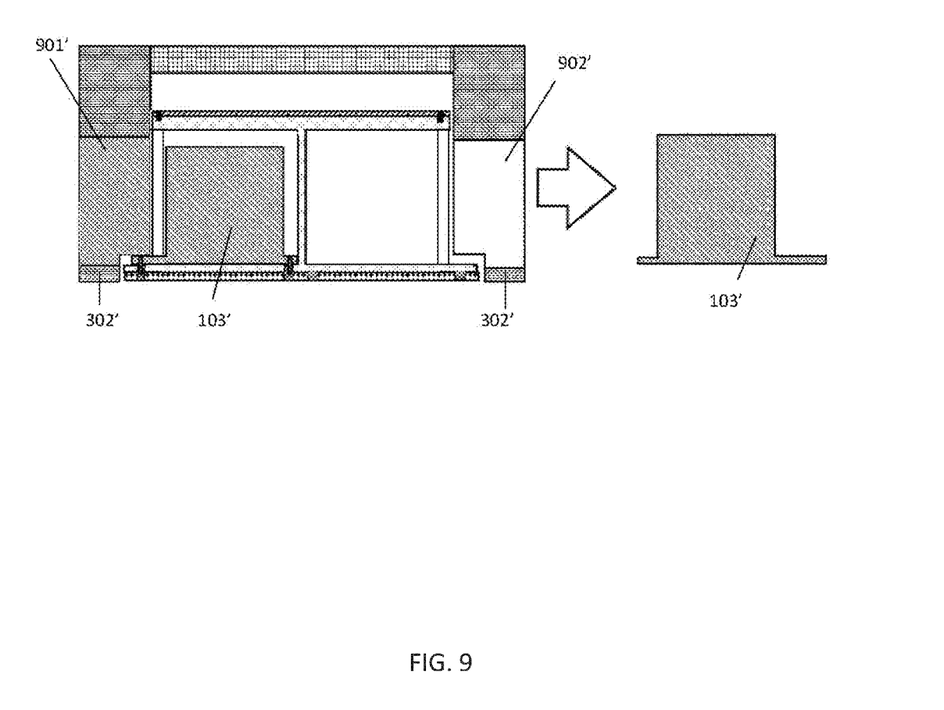
FIG. 9 illustrates a schematic sectional view showing the removal of a battery module from the electric vehicle chassis including the battery back according to a second example of the present disclosure.

FIGS. 8 and 9 illustrate schematic sectional views showing the removal of a battery module from the electric vehicle chassis including the battery back according to the second example of the present disclosure. As shown in FIG. 8, the passage for removing a malfunctioned battery module 103' is formed by directly removing a corresponding side sill 302'. As shown in FIG. 9, each side sill 302' of the electric vehicle chassis including the battery pack 101' according to the second example is provided with at least one detachable part 901'. A passage 902' for removing the malfunctioned battery module 103' is formed by removing the detachable part 901'. The size of the detachable part 901' may meet the requirement that the battery modules 103' be able to pass through the passage 902' formed by removing the detachable part 901' without influencing the supporting strength of the side sills 302'. The location of the detachable part 901' may meet the requirement that the connection and fixation of the side sill 302' with other components is not significantly influenced.

It should be noted that according to different design requirements of an electric vehicle chassis, the battery pack 101' may be first removed from the electric vehicle chassis 300'. Then, the malfunctioned battery module 103' may be removed from the battery pack 101' and replaced with a new battery module 103'.

The technical features in the embodiments described above can be randomly combined. The foregoing descriptions are embodiments and accompanying drawings of the present disclosure, and are not used for limiting the scope of protection of the present disclosure. Any content implemented by the same technical means or encompassed in the scope of protection of the contents of the claims below do not depart from the scope of the present disclosure, but fall into the scope of protection of the applicant.

What is claimed is:
1. A battery pack for an electric vehicle, the battery pack comprising:
   a plurality of battery modules;
   a support part provided with a bottom for supporting the plurality of battery modules, sides, a top, and an accommodation space formed by the bottom, the sides, and the top for accommodating the plurality of battery modules;

at least one opening provided on either the bottom or sides of the support part to enable the plurality of battery modules to be passed through the at least one opening and be detachably mounted to either the bottom or sides of the support part so as to be supported by either the bottom or sides;

a layer mounted above the top of the support part to cover the plurality of battery modules accommodated in the support part; and a protector sheet mounted below the bottom of the support part to cover the plurality of battery modules accommodated in the support part; and, wherein the at least one opening is provided on the bottom of the support part.

2. The battery pack of claim 1, further comprising:

first and second mounting flanges provided on each of the plurality of battery modules, wherein the first and second mounting flanges are respectively arranged on two opposite sides of a bottom of each of the plurality of battery modules so that the plurality of battery modules can be mounted to the bottom of the support part using the first and second mounting flanges, and wherein the first and second mounting flanges are mounted below the bottom of the support part.

3. The battery pack of claim 2, wherein the plurality of battery modules are mounted to the bottom of the support part through fasteners.

4. The battery pack of claim 1, wherein the layer mounted above the top of the support part is a carbon fiber composite layer.

5. An electric vehicle chassis comprising:

an underbody panel located below a cabin of an electric vehicle;

two side sills extending along the longitudinal direction of the underbody panel, wherein each of the two side sills comprises an upper part and a lower part and is connected to one of the two opposite sides of the underbody panel through the upper part thereof;

a battery pack located below the underbody panel and between the two side sills, wherein the battery pack comprises:

a plurality of battery modules;

a support part provided with a bottom for supporting the plurality of battery modules, sides, a top, and an accommodation space formed by the bottom, the sides, and the top for accommodating the plurality of battery modules; and at least one opening provided on either the bottom or sides of the support part to enable the plurality of battery modules to be passed through the at least one opening and be detachably mounted to either the bottom or sides of the support part so as to be supported by either the bottom or sides; and wherein the battery pack is configured to be mounted to the lower parts of the two side sills through the bottom of the support part.

6. The electric vehicle chassis of claim 5, further comprising:

a layer mounted above the top of the support part to cover the plurality of battery modules accommodated in the support part.

7. The electric vehicle chassis of claim 5, wherein the at least one opening provided on the support part is provided on the bottom of the support part.

8. The electric vehicle chassis of claim 7, wherein the bottom of the support part is provided with mounting flanges extending along the longitudinal direction of the underbody panel, wherein the battery pack is mounted to the lower parts of the two side sills using the mounting flanges.

9. The electric vehicle chassis of claim 8, wherein the mounting flanges of the support part are mounted to the lower parts of the two side sills through fasteners.

10. The electric vehicle chassis of claim 7, further comprising:

first and second mounting flanges provided on each of the plurality of battery modules, wherein the first and second mounting flanges are respectively arranged on two opposite sides of a bottom of each of the plurality of battery modules so that the plurality of battery modules can be mounted to the bottom of the support part using the first and second mounting flanges, and wherein the first and second mounting flanges are mounted below the bottom of the support part.

11. The electric vehicle chassis of claim 10, wherein the plurality of battery modules are mounted to the bottom of the support part through fasteners.

12. The electric vehicle chassis of claim 7, further comprising:

a protector sheet mounted below the bottom of the support part to cover the plurality of battery modules accommodated in the support part.

13. The electric vehicle chassis of claim 7, wherein the layer mounted above the top of the support part is a carbon fiber composite layer.

14. A method for replacing a battery module in an electric vehicle, the method comprising:

identifying a first battery module from among a plurality of battery modules in a battery pack, wherein the battery pack is located within the electric vehicle and comprises:

the plurality of battery modules;

a support part provided with a bottom for supporting the plurality of battery modules, sides, a top, and an accommodation space formed by the bottom, the sides, and the top for accommodating the plurality of battery modules;

at least one opening provided on the bottom of the support part to enable the plurality of battery modules to be passed through the at least one opening and be detachably mounted to the bottom of the support part so as to be supported by the bottom;

a layer mounted above the top of the support part to cover the plurality of battery modules accommodated in the support part; and a protector sheet mounted below the bottom of the support part to cover the plurality of battery modules accommodated in the support part; and, wherein the at least one opening is provided on the bottom of the support part;

detaching the first battery module from the bottom of the support part;

removing the first battery module from the support part by passing the first battery module through the at least one opening;

inserting a second battery module into the support part by passing the second battery module through the at least one opening; and mounting the second battery module to the bottom of the support part.

15. The method of claim 14, wherein the second battery module has a higher electrical potential energy than the first battery module.

16. The method of claim 15, further comprising:
- removing a protector sheet from below the bottom of the support part.

17. The method of claim 15, further comprising:
- removing fasteners that are configured to mount the first battery module to the bottom of the support part.

* * * * *